United States Patent [19]
Curchack

[11] 4,002,064
[45] Jan. 11, 1977

[54] RIFLED SOFT RECOVERY SYSTEM

[75] Inventor: Herbert D. Curchack, Rockville, Md.

[73] Assignee: The United States of America as represented by the Secretary of the Army, Washington, D.C.

[22] Filed: Feb. 19, 1976

[21] Appl. No.: 659,320

[52] U.S. Cl. .............................. 73/167; 250/222 R
[51] Int. Cl.² .......................................... G01L 5/14
[58] Field of Search ............ 73/167, 12, 9; 250/222

[56] References Cited
UNITED STATES PATENTS

| | | | |
|---|---|---|---|
| 2,498,045 | 2/1950 | Looney et al. | 73/167 |
| 3,718,041 | 2/1973 | Jones et al. | 73/167 |
| 3,940,981 | 3/1976 | Covey et al. | 73/167 |

*Primary Examiner*—Donald O. Woodiel
*Attorney, Agent, or Firm*—Nathan Edelberg; Robert P. Gibson; Saul Elbaum

[57] ABSTRACT

A system is disclosed for decelerating a rifled projectile in flight. A gun bore rifled with a land pattern having a characteristic number of turns per bore diameter, has a muzzle at a first angular orientation along the projectile's flight axis and a characteristic recoil distance. A deceleration tube having an opened end is located at a separation distance from the gun muzzle along the flight axis. The deceleration tube has a rifled land pattern with a second angular orientation at the opened end, displaced from the first angular orientation substantially by the product of the characteristic number of turns per bore diameter times the sum of the separation distance and the characteristic recoil distance. When the projectile is fired from the rifled gun, it has a rifle pattern engraved thereon and it travels along the flight axis undergoing rotational motion imparted by the rifle land pattern of the gun. The angular orientation of the deceleration tube causes the projectile to be brought into positive engagement with the rifled land pattern in the deceleration tube, so as to be decelerated without damaging the projectile. A pneumatic or hydraulic pressure can be efficiently brought to bear against the advancing projectile in the tube, by virtue of the accurate engagement of the projectile's engraved pattern with the rifle land pattern in the deceleration tube.

12 Claims, 3 Drawing Figures

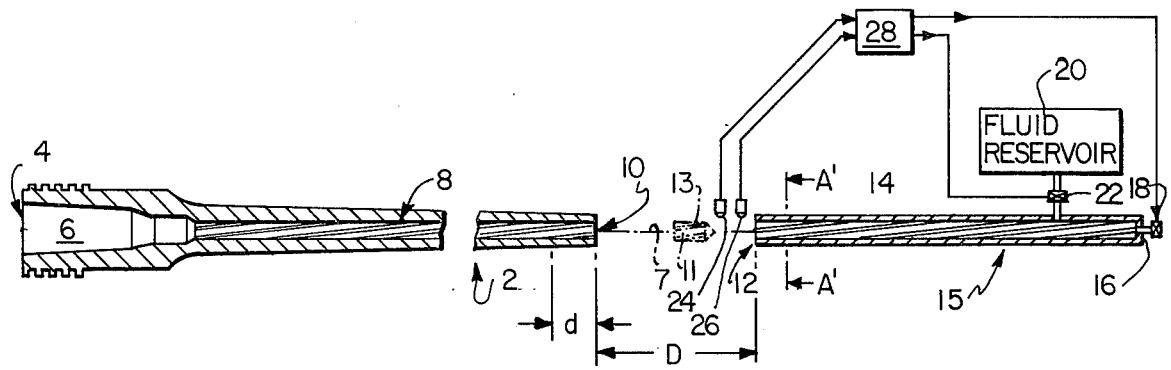
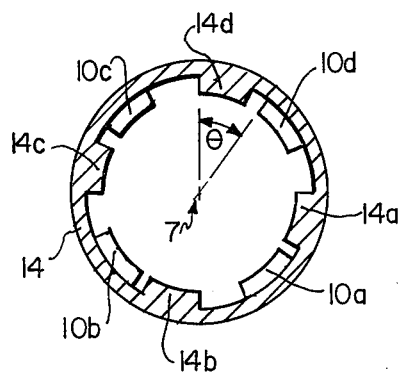
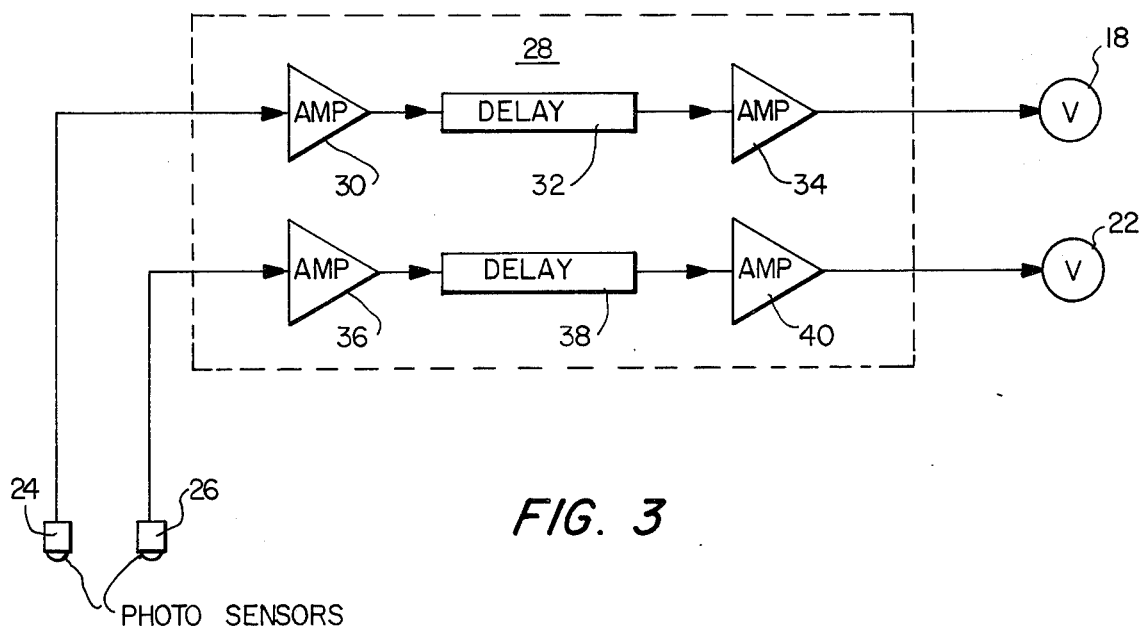

RIFLED SOFT RECOVERY SYSTEM

RIGHTS OF THE GOVERNMENT

The invention described herein may be manufactured and used by or for the United States Government for governmental purposes without payment to me of any royalty thereon.

FIELD OF THE INVENTION

The invention disclosed generally relates to apparatus for decelerating projectiles in flight, and particularly concerns a rifled soft recovery system for nondestructively recovering projectiles fired from artillery.

BACKGROUND OF THE INVENTION

Various approaches have been taken in the prior art to nondestructively recover projectiles fired from artillery. Some approaches have employed absorbent material into which the projectile is fired. Often times the projectile cannot be recovered using this technique without some damage to the fuzes or guidance fins mounted thereon. Other approaches have employed the use of receiving tubes supplied with compressed air or a liquid to pneumatically or hydraulically decelerate the projectile which is fired therein. Problems have arisen with this approach, however, when applied to decelerating a projectile with rifle engravings on its sides. The principal problem is the inability to form a fluid tight seal when a rifled projectile is fired into the prior art receiving tube. Since the fluid readily escapes past the grooved portion of the engraved rifled pattern on the periphery of the projectile, the projectile cannot be adequately decelerated in a short length of tube. What the prior art requires is a compact means for decelerating rifled projectiles so they may be recovered nondestructively.

OBJECTS OF THE INVENTION

It is therefor an object of the invention to nondestructively recover a rifled projectile in an efficient manner.

It is still another object of the invention to nondestructively recover the rifled projectile by a compact means.

It is a further object of the invention to provide a soft recovery system which does not require modifications to the projectile.

SUMMARY OF THE INVENTION

These and other objects, features and advantages of the invention will be accomplished by the rifled soft recovery system disclosed herein. The system decelerates a projectile in flight, having rifled engravings thereon. The projectile is fired by a gun bore rifled with a land pattern having a characteristic number of turns per bore diameter. The gun's muzzle has a first angular orientation along the projectile's flight axis and a characteristic recoil distance.

A deceleration tube having an opened end is placed at a first distance from the gun muzzle. The tube has a rifled land pattern having a second angular orientation at the opened end about the projectile flight axis, displaced from the first angular orientation substantially by the product of the characteristic turns per bore diameter times the sum of the first distance and the characteristic recoil distance. A pneumatic or hydraulic pressure can be efficiently imposed on the projectile within the tube, directed opposite to the direction of flight, by virtue of the accurate engagement of the projectile's engraved rifled pattern with the rifle land pattern in the deceleration tube. There results an efficient, compact means for decelerating a rifled projectile so that it may be nondestructively recovered.

DESCRIPTION OF THE FIGURES

These and other objects, features and advantages of the invention are more particularly described with reference to the accompanying figures.

FIG. 1 is a cross sectional view showing the relationship of the gun 2 and the deceleration tube 15.

FIG. 2 is a cross sectional view along A'-A' in FIG. 1, showing the angular displacement of the rifling for the deceleration tube with respect to the rifling for the gun.

FIG. 3 is a schematic diagram of a valve control circuit for the deceleration tube of FIG. 1.

DISCUSSION OF THE PREFERRED EMBODIMENT

The basic concept underlying the rifled soft recovery invention is the discovery that the most efficient way to nondestructively stop a rifled projectile in a fluid resistant deceleration tube, is to rifle the interior bore of the deceleration tube and to position it relative to the gun so that the rifled engravings on the sides of the projectile engage the rifling in the deceleration tube as the projectile enters the tube, thereby insuring a good fluid seal between the projectile and the tube wall. FIG. 1 illustrates the preferred embodiment of this inventive concept, with the rifled deceleration tube 15 coaxial with the rifled gun 2 and angularly displaced therefrom by a predetermined angle $\theta$ of free flight twist of the projectile 11. The calculation of the angle $\theta$ of free flight twist, is developed in the following discussion on ballistics.

In FIG. 1, the gun 2 is of a conventional design and comprises the breech 4 within which is the shell chamber 6. The projectile 11 is fired through the rifled bore 8 and exits from the gun at the muzzle 10. The rifling within the rifled bore 8 consists of splines which spiral along the bore surface. The raised portions 10a-10d are called lands, the spaces between them are called grooves. The spiral may have a constant angle of twist, i.e. a helix, or it may have a variable angle of twist conforming to some exponential expression. As the projectile moves through the bore 8, it turns with the rifling at an angular velocity proportional to the linear velocity of the projectile and to the tangent of the angle of twist.

The rifled land pattern of the rifled bore 8 is shown to better advantage in the cross section A-A' of FIG. 2, where the lands 10a, 10b, 10c and 10d of the rifled bore 8 are shown. The projectile's contact with the rifling is assured by having the diameter of the jacket of the bullet or the rotating band of a larger projectile, at least equal to the groove diameter of the bore 8. Then, just as the projectile 11 starts to move from the shell chamber 6 into the rifled bore 8, the band or jacket of the projectile is forced into the rifling, 10a-10d. This process is called engraving and takes place at the beginning, or origin, of the rifling in the bore 8. For recoilless guns, rotating bands are pre-engraved to eliminate the large engraving forces which are undesirable in this type of weapon. Some mortar projectiles have a flared skirt, or sabot, the base of which is pressed into the rifling by the propellent gas pressure. Rotating bands are bands of relatively soft material which are welded, bonded or mechanically attached to the projectile 11. Jackets may be considered as bands which cover the bullets completely. Either a jacket, a rotating band, or a sabot is necessary to transmit to the projectile 11 the angular accelerating force induced by the rifling 10a–10d, and to serve as a seal to prevent propellent gases from escaping past the projectile.

Rotating bands or their equivalent on the projectile perform two functions when the projectile is fired. They transmit the rifling torque to the projectile and seal or obturate the propellent gases to minimize leakage past the projectile. Both functions are performed effectively after the bands are engraved into the rifling. Since engraving is somewhat of a swaging operation, appreciable resistance is offered by the rifling to the rotating band. This resistance is in the nature of a radial force around the periphery of the projectile and its frictional counterpart. The radial force, when distributed uniformly over the band surface, becomes the rotating band pressure. The band pressure is higher on the rifling lands than on the bottom of the grooves because more material is displaced by the lands 10a–10d.

In small arms or artillery, recoil is rearward motion of the gun 2 due to firing the projectile 11. In recoiless weapons, recoil can occur if a residual impulse exists between the gun tube and the nozzle which moves the gun rearward. A given gun 2 has a characteristic recoil distance d which depends upon the weight of the gun, the length of the barrel or bore 8 and the weight of the projectile 11. This can be seen as follows. Consider the distance a gun barrel will recoil when it fires a shell, assuming no recoil control. The force on the projectile $F_p$ is equal and opposite to the force on the barrel $F_g$. Thus $$F_p = -F_g. \qquad (1)$$

Applying Newton's second law, $$M_p \ddot{X}_p = -M_g \ddot{X}_g, \qquad (2)$$

where $M_p$ and $M_g$ are the masses of the projectile and gun, respectively and $\ddot{X}_p$ and $\ddot{X}_g$ are the accelerations of the projectile and gun, respectively. Integrating twice over time, one obtains $$M_p X_p = -M_g X_g, \qquad (3)$$

where $X_p$ is the distance the projectile travels before leaving the muzzle and $X_g$ is the recoil distance, $d$ of the gun. If $L$ is the length of the gun bore, then $$X_p = L + X_G. \qquad (4)$$

Substituting from (3), $$M_p (L + X_g) = -M_g X_g \qquad (5)$$

or expressed otherwise, $$d = -X_g = \frac{+M_p L}{M_p + M_g} = \frac{+W_p L}{W_p + W_g} \qquad (6)$$

where $W_p$ and $W_g$ are the weights of the projectile and gun, respectively. Therefore, without auxiliary recoil control, the recoil distance d depends only on the initial conditions of the weight of the gun $W_p$, the weight of the bullet $W_g$, and the length of the bore $L$ and not upon the achieved velocity of the projectile or burning rate of the propellent. The following Table I illustrates values of recoil distance d for several standard artillery pieces.

TABLE I

|  | GUN CALIBER (mm) | | | |
|---|---|---|---|---|
|  | 105 | 155 | 175 | 107 |
| Wp | 28.5 | 95.8 | 147.8 | 26 |
| L (inches) | 78 | 177 | 352 | 57 |
| Wg | 1537 | 3142 | 13,800 | 627 |
| d(inches) | 1.42 | 3.46 | 3.73 | 2.27 |

FIG. 1 shows the system for decelerating the rifled projectile in flight which comprises the gun 2 and the deceleration tube 15. The relative angular orientation of the rifling at the muzzle 10 with respect to rifling at the open end 12 of the deceleration tube 15, must take into consideration the quiescent state separation distance D and the recoil distance d. Over small distances, the air drag on the projectile will have a negligible effect on the trajectory thereof along the axis of flight 7 and the projectile 11 will effectively twist itself through the air at a pitch determined by the characteristic number of turns per bore diameter of the rifling land pattern at the muzzle 10 of the gun 2. To determine how far the projectile will twist when it travels over the recoil distance $d$, the turns per bore diameter characteristic, R of the gun 2 must be known. The following table gives example values of this characteristic for four artillery pieces.

TABLE II

|  | GUN CALIBER, C (mm) | | | |
|---|---|---|---|---|
|  | 105 | 155 | 175 | 107 |
| Turns per bore diameter, R | 1/20 | 1/20 | 1/20 | 1/20 |

To calculate the free flight twist $\theta$, in degrees multiply the distance traveled, in inches, which is the sum of $d$ and D in FIG. 1, times the turns per bore diameter characteristic R of the rifled land pattern in the muzzle 10 of the gun 2, and divide by the bore diameter C, in millimeters, as shown in equation (7).

$$\theta = \frac{360 \times 25.4 \times (d + D)}{C} \times R \qquad (7)$$

The following Table III gives the value of the angular displacement $\theta$, in degrees, for the projectile traversing the recoil distance d with the quiescent separation distance D equal to zero.

TABLE III

| GUN CALIBER (mm) | | | |
|---|---|---|---|
| 105 | 155 | 175 | 107 |
| 6.18° | 10.2° | 9.7° | 9.7° |

It is seen that when the quiescent separation distance D is zero, conventional projectiles produce approximately 10° of free flight twist.

Thus, in the arrangement of the gun 2 and deceleration tube 15 shown in FIG. 1, the relative angular orientation of the muzzle 10 with respect to the open end 12 of the tube 15 must substantially equal the free flight twist θ of the projectile in traversing the distance which is the sum of the quiescent separation distance D and the recoil distance d, in order for the engraved rifled grooves 13 in the projectile 11 to accurately engage the rifled lands 14a – 14d at the open end 12 of the deceleration tube 15. This relative angular orientation θ, which equals the free flight twist, is seen to better advantage in the A–A' section of FIG. 2. The rifle pattern for the bore 8 of gun 2 is shown in FIG. 1 as a righthanded helical twist, so the angular displacement θ between the muzzle 10 and the open end 12 is shown as a counter clockwise displacement in FIG. 2.

Means are contained within the deceleration tube 15 for imposing a force on the projectile opposite to the direction of its flight so as to decelerate the projectile and bring it to rest. One approach to imposing this negative force is to rely upon the frictional forces of the lands 14a–14d of the tube 15 for decelerating the projectile. This operation works well for preventing destruction of the projectile during deceleration, so that it may be subsequently studied or reused. However, simple frictional forces applied by lands 14a–14d will not efficiently bring the projectile to rest, and a deceleration tube using this mode of deceleration will, of necessity, be relatively long.

An alternate and more efficient approach to decelerating the projectile within the deceleration tube 15 is to close the end 16 opposite to the opened end 12 and to introduce a fluid into the interior of the deceleration tube. The compression of the fluid by the advancing projectile 11 will impose a force directed oppositely to the direction of motion of the projectile, thereby bringing it to rest. The fluid can be either a liquid or a gas. The fluid is compressed by the fluid seal formed by the engagement of the rifled engravings 13 on the projectile 11 with the rifled land pattern 14a–14d in the deceleration tube 15. The close fit of the projectile to the rifled interior of the tube 15 precludes the flow of the fluid about the projectile, thereby enhancing the efficiency with which the projectile is brought to rest within the tube 15. Such a tube may be relatively short in length and yet efficiently and nondestructively bring the projectile 11 to rest.

A relief valve 18 may be mounted in the closed end 16 of the deceleration tube 15, for relieving the pressure of the fluid compressed by the projectile 11 as it advances in the deceleration tube 15. The relief valve 18 may be actuated by a projectile sensing means 24 mounted proximate to the opened end 12 of the deceleration tube 15. When the projectile transverses a predetermined length of the tubular member 15, and is brought to rest by compressing the fluid contained within the tube 15, the relief valve 18 may be actuated to release the fluid which is now under pressure, so that the projectile, having once been brought to rest within the tube 15, is not thereafter propelled in the reverse direction out of the opened end 12, thereby possibly causing damage to the muzzle end of the gun 2.

The projectile sensing means for the relief valve 18 may be shown to better advantage in FIG. 3. The photosensor 24 senses the flash from the muzzle of the gun 2 as the projectile 11 issues therefrom. The photosensor 24 sends a signal, which is amplified by the amplifier 30, to the delay line 32. The delay line 32 may be adjusted to delay the signal for a period of time necessary to bring the projectile to rest within the deceleration tube 15. This delay time can be emperically determined. The delayed signal is outputted from the delay line 32, amplified by the amplifier 34, and actuates the relief valve 18 to release the pressurized fluid in the end 16 of the tube 15, thereby preventing significant retrograde motion of the projectile within the tube. It is seen that the fluid to be compressed by the projectile can be either a liquid or a gas.

The fluid which will serve to retard the motion of the projectile within the tube 15, may be introduced from a fluid reservoir 20, wherein the fluid is maintain under pressure, through the valve 22 into the interior of the tube 15. The mechanism for operating the valves 18 and 22 is shown in FIGS. 1 and 3. The tube 15 is pressurized by the inlet valve 22 mounted at the closed end 16 of the deceleration tube 15. The gas reservoir 20 is connected by means of the inlet valve 22 to the interior of the deceleration tube, and contains a reservoir of the fluid under pressure. A photosensor 26 is mounted proximate to the opened end 12 of the deceleration tube 15, for actuating the gas valve 22, when the projectile traverses a first predetermined length of the deceleration tube 15. The pressurized fluid entering into the interior of the tube 15 through the gas valve 22 will exert a retarding force on the projectile's motion.

The relief valve 18 is mounted at the closed end 16 of the deceleration tube 15 and is actuated by the photosensor 24 mounted proximate to the opened end 12 of the tube 15. Photosensor 24 actuates the relief valve 18 when the projectile traverses a second predetermined length greater than the first predetermined length in the deceleration tube. When the relief valve 18 is actuated, the pressurized gas compressed within the deceleration tube by the advancing projectile, is vented through the valve 18 to the ambient. Thus the projectile is brought to rest within the tubular member 15, without significant retrograde motion.

Photosensor 26 senses the blast from the muzzle 10 and issues a signal which is amplified by the amplifier 36 and delayed by the delay line 38 for a relatively short period of time sufficient to allow the engraved rifle pattern 13 of the projectile 11 to fully engage the rifling 14a–14d within the deceleration tube 15 and present a good fluid seal therewith. The delayed signal is output from the delay line 38, amplified by the amplifier 40 and actuates the valve 22, thereby introducing the fluid under pressure into tube 15, which commences to retard the motion of the projectile within the tube 15. The photosensor 24 senses the muzzle blast and issues a signal at substantially the same time as does the photosensor 26. The signal from the photosensor 24 is amplified by the amplifier 30 and delayed by the delay line 32 for a period of time longer than the delay period in the delay line 38. The longer delay period in the delay line 32 corresponds to the empirically determined time required to bring the projectile to rest within the tube 15. After this longer delay time has expired, the signal is output from the delay 32, amplified in amplifier 34, and actuates the valve 18, venting the pressurized gas compressed by the advancing projectile, so that the projectile may be brought to rest without significant retrograde motion.

The resulting rifled soft recovery system disclosed herein, efficiently and nondestructively brings to rest a rifled projectile so that it may be subsequently studied or reused for additional training shots. The rifled soft recovery system is more compact than prior art systems for recovering rifle projectiles because it provides more fluid tight seal between the projectile and the decelerating tube than has been available in the prior art.

As should now be appreciated, the objectives set forth at the outset of this specification have been successfully achieved. It should further be understood that the invention is not to be limited to the exact details discussed in the preferred inventive embodiment, for obvious modifications will occur to persons skilled in the art.

Accordingly, what is claimed is:

1. A system for decelerating a projectile in flight, having rifle engravings thereon, fired by a gun bore rifled with a land pattern having a characteristic number of turns per bore diameter, whose muzzle has a first angular orientation along the projectile's flight axis, the gun having a characteristic recoil distance, comprising:
   a tubular member having an opened end at a first distance from said gun muzzle, with a rifled land pattern having a second angular orientation at said opened end, about said projectile flight axis, displaced from said first angular orientation substantially by the project of said characteristic turns per bore diameter times the sum of said first distance and said characteristic recoil distance;
   means contained within said tubular member for imposing a force on said projectile opposite to the direction of flight;
   whereby said projectile is decelerated in flight.

2. The system of claim 1, wherein:
   said rifled land pattern in said tubular member has the same characteristic turns per bore diameter as that for said gun bore.

3. The system of claim 1, wherein:
   said means for imposing a force is the rifled land pattern of said tubular member;
   whereby the projectile is decelerated by the frictional force imposed by said tubular member's rifled land pattern.

4. The system of claim 1, wherein:
   said tubular member has a closed end opposite to said opened end;
   said means for imposing a force is a fluid contained within said tubular member.

5. The system of claim 4, wherein:
   said fluid is a gas which is compressed by the gas seal formed by the engagement of said rifle engravings on said projectile with said rifled land pattern in said tubular member.

6. The system of claim 5, which further comprises:
   a relief valve mounted in said closed end of said tubular member, for relieving the pressure of the gas compressed by said projectile in said tubular member.

7. The system of claim 6, which further comprises:
   a projectile sensing means mounted proximate to said open end of said tubular member, for actuating said relief valve when said projectile traverses a predetermined length of said tubular member.

8. The system of claim 5, which further comprises:
   a first gas valve mounted at said closed end of said tubular member;
   a gas reservoir connected by means of said first gas valve to said tubular member, containing a pressurized gas;
   a first projectile sensing means mounted proximate to said open end of said tubular member, for actuating said first gas valve when said projectile traverses a first predetermined length of said tubular member;
   said pressurized gas entering said tubular member through said first valve and exerting a retarding force on said projectile's motion;
   whereby the deceleration of said projectile is enhanced.

9. The system of claim 8, which further comprises:
   a second gas valve mounted at said closed end of said tubular member;
   a second projectile sensing means mounted proximate to said open end of said tubular member, for actuating said second gas valve when said projectile traverses a second predetermined length greater than said first predetermined length of said tubular member;
   said pressurized gas compressed within said tubular member by said projectile, being vented by said second gas valve;
   whereby said projectile is brought to rest within said tubular member.

10. The system of claim 9, wherein:
    said first projectile sensing means comprises a first photosensor having an output connected to a first signal delay means having a first characteristic delay time, the output of which is connected to said first valve;
    said second projectile sensing means comprises a second photosensor having an output connected to a second signal delay means having a second characteristic delay time longer than said first delay time, the output of which is connected to said second valve.

11. The system of claim 4, wherein:
    said fluid is a liquid which is compressed by the fluid seal formed by the engagement of said rifle engravings on said projectile with said rifled land pattern in said tubular member.

12. The system of claim 11, which further comprises:
    a fluid bleed valve mounted in said closed end of said tubular member, for relieving the pressure on said liquid compressed by said projectile.

* * * * *